(12) United States Patent
Rink

(10) Patent No.: US 7,393,009 B2
(45) Date of Patent: Jul. 1, 2008

(54) DUAL-FLOW INFLATOR

(75) Inventor: Karl K. Rink, Princeton, ID (US)

(73) Assignee: Automotive Systems Laboratory, Inc., Armada, MI (US)

( * ) Notice: Subject to any disclaimer, the term of this patent is extended or adjusted under 35 U.S.C. 154(b) by 260 days.

(21) Appl. No.: 11/239,601

(22) Filed: Sep. 29, 2005

(65) Prior Publication Data

US 2006/0066086 A1 Mar. 30, 2006

Related U.S. Application Data

(60) Provisional application No. 60/614,741, filed on Sep. 30, 2004.

(51) Int. Cl.
*B60R 21/26* (2006.01)

(52) U.S. Cl. ....................................................... 280/737

(58) Field of Classification Search ................ 280/737, 280/736, 740, 741; 102/30; *B60R 21/26*
See application file for complete search history.

(56) References Cited

U.S. PATENT DOCUMENTS

| | | | | |
|---|---|---|---|---|
| 3,434,426 | A * | 3/1969 | De Dapper ............... | 102/202.8 |
| 5,348,344 | A * | 9/1994 | Blumenthal et al. ......... | 280/737 |
| 5,709,406 | A * | 1/1998 | Buchanan ................... | 280/737 |
| 5,743,559 | A * | 4/1998 | Nakajima et al. ........... | 280/741 |
| 5,788,275 | A * | 8/1998 | Butt et al. ................... | 280/737 |
| 6,039,348 | A * | 3/2000 | Niederman et al. ......... | 280/741 |
| 6,086,094 | A * | 7/2000 | Stevens et al. .............. | 280/741 |
| 6,196,582 | B1 * | 3/2001 | Sparkman et al. ........... | 280/736 |
| 6,206,412 | B1 * | 3/2001 | Swann et al. ............. | 280/730.2 |
| 6,233,908 | B1 * | 5/2001 | Rink et al. .................... | 53/440 |
| 6,234,523 | B1 * | 5/2001 | Tokoro et al. ................ | 280/737 |
| 6,588,796 | B2 * | 7/2003 | Webber et al. .............. | 280/737 |
| 6,746,046 | B2 * | 6/2004 | Rink et al. ................... | 280/737 |
| 6,820,898 | B2 | 11/2004 | Dinsdale et al. ............. | 280/737 |
| 6,851,705 | B2 | 2/2005 | Young et al. ................ | 280/729 |

(Continued)

*Primary Examiner*—Anne Marie Boehler
*Assistant Examiner*—Karen Jane J. Amores
(74) *Attorney, Agent, or Firm*—L.C. Begin & Associates, PLLC

(57) ABSTRACT

A stored gas inflator (10) comprising a pressure vessel (12) for storing a pressurized medium therein. The pressure vessel (12) has a wall (14) defining an interior of the vessel. A gas flow conduit (26) extends through the interior of the pressure vessel (12). The conduit (26) has a first portion extending from the interior of the vessel (12) through a first portion of the wall (14) to an exterior of the vessel, and a second portion extending from the interior of the vessel through a second portion of the wall (14) to the exterior of the vessel. Rupturable barriers (40) are formed along a portion of the conduit (26) that extends through the interior of the vessel, for separating an interior of the conduit (26) from the interior of the pressure vessel (12) prior to activation of the inflator (10). The barriers (40) are rupturable upon activation of the inflator (10) to enable fluid communication between the interior of the conduit (26) and the interior of the pressure vessel (12). This permits the pressurized inflation medium to flow from the pressure vessel (12) into the conduit (26) and out of the conduit in opposing directions into one or more associated airbag(s) or other inflatable element(s). Use of multiple gas flow paths from the inflator (10) permits a greater quantity of gas to flow relatively rapidly from the inflator (10).

20 Claims, 4 Drawing Sheets

U.S. PATENT DOCUMENTS

| | | |
|---|---|---|
| 6,854,763 B2 | 2/2005 | Dinsdale et al. ............. 280/737 |
| 7,155,353 B2* | 12/2006 | Okamoto et al. .............. 702/65 |
| 7,188,567 B1* | 3/2007 | Italiane et al. ............. 102/530 |
| 7,192,055 B2* | 3/2007 | Stevens et al. ............. 280/741 |
| 2001/0048218 A1* | 12/2001 | Whang et al. ............... 280/737 |
| 2003/0137135 A1* | 7/2003 | Welz .......................... 280/741 |
| 2003/0178830 A1* | 9/2003 | Flamm ....................... 280/741 |
| 2003/0230882 A1* | 12/2003 | Hosey et al. ................. 280/737 |
| 2004/0227337 A1* | 11/2004 | Ruckdeschel et al. ....... 280/736 |
| 2005/0073138 A1* | 4/2005 | Digangi et al. .............. 280/737 |
| 2005/0173906 A1* | 8/2005 | Nakayasu et al. ........... 280/737 |
| 2005/0236821 A1* | 10/2005 | Hofmann et al. ............ 280/737 |
| 2006/0001246 A1* | 1/2006 | Gotoh et al. ................ 280/736 |
| 2006/0055160 A1* | 3/2006 | Cook et al. .................. 280/741 |
| 2006/0220363 A1* | 10/2006 | Blackburn ................... 280/736 |
| 2007/0085311 A1* | 4/2007 | Hofmann et al. ............ 280/739 |
| 2007/0090635 A1* | 4/2007 | Okamoto et al. ............ 280/741 |
| 2007/0182141 A1* | 8/2007 | Yamazaki et al. ........... 280/741 |

* cited by examiner

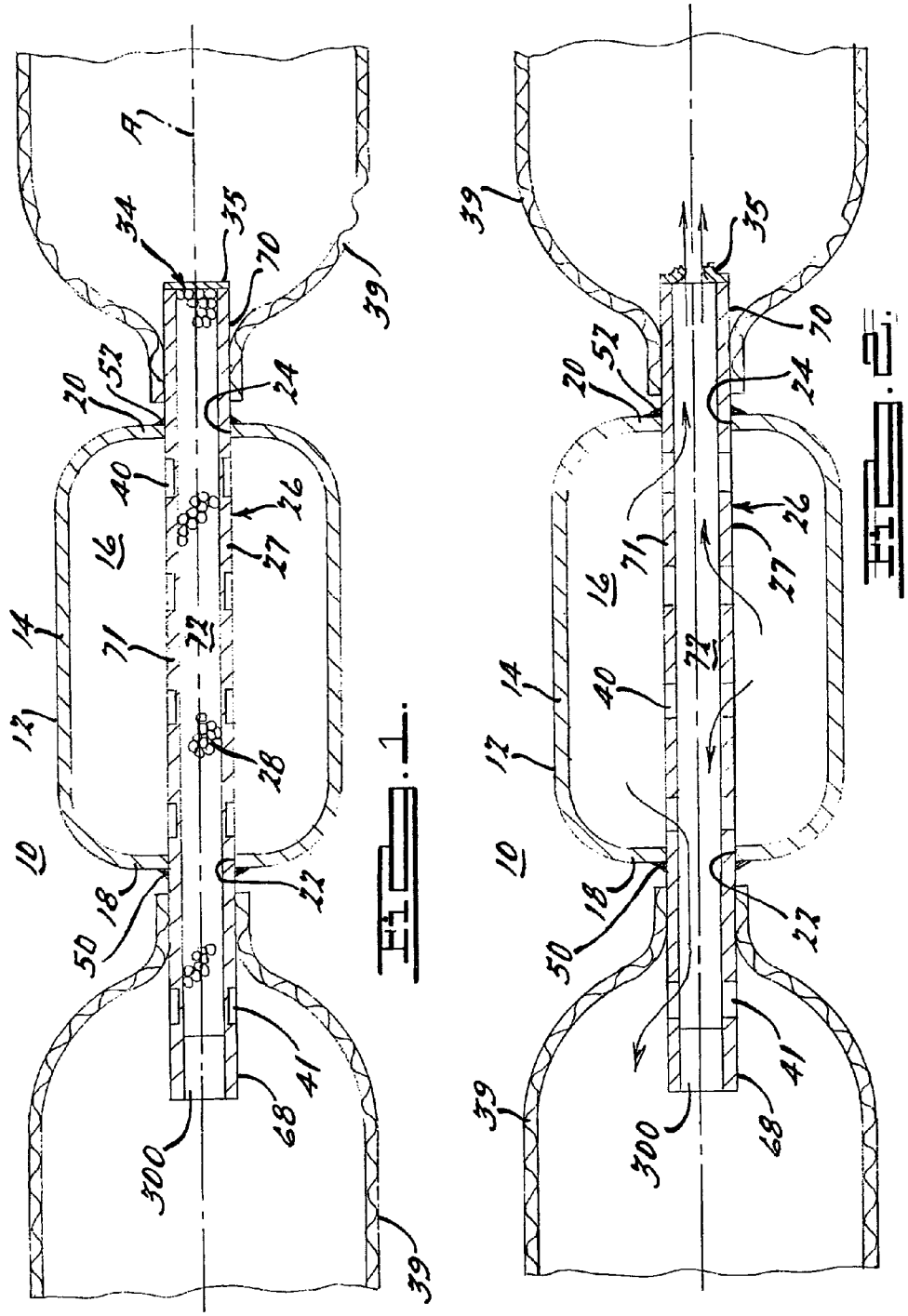

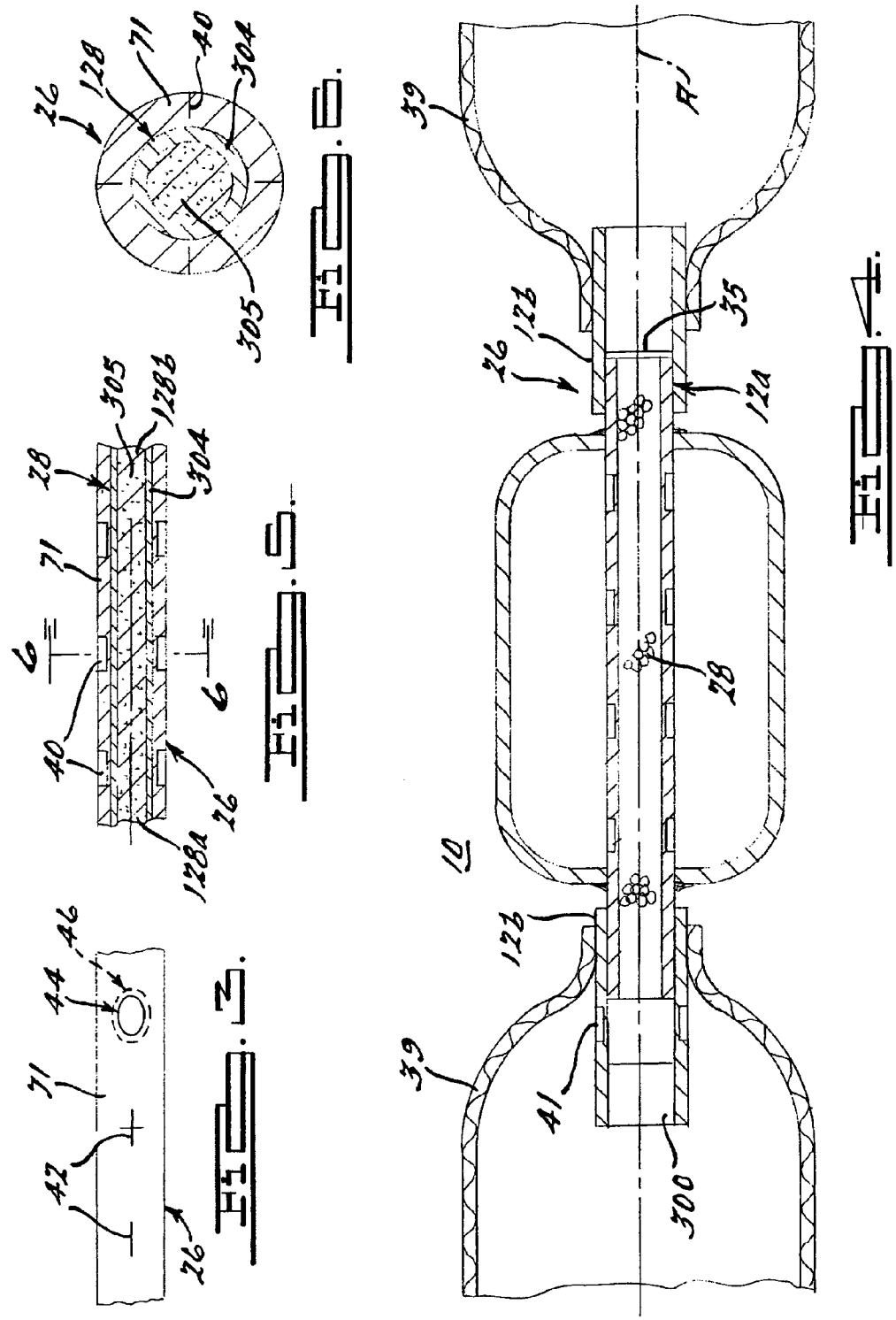

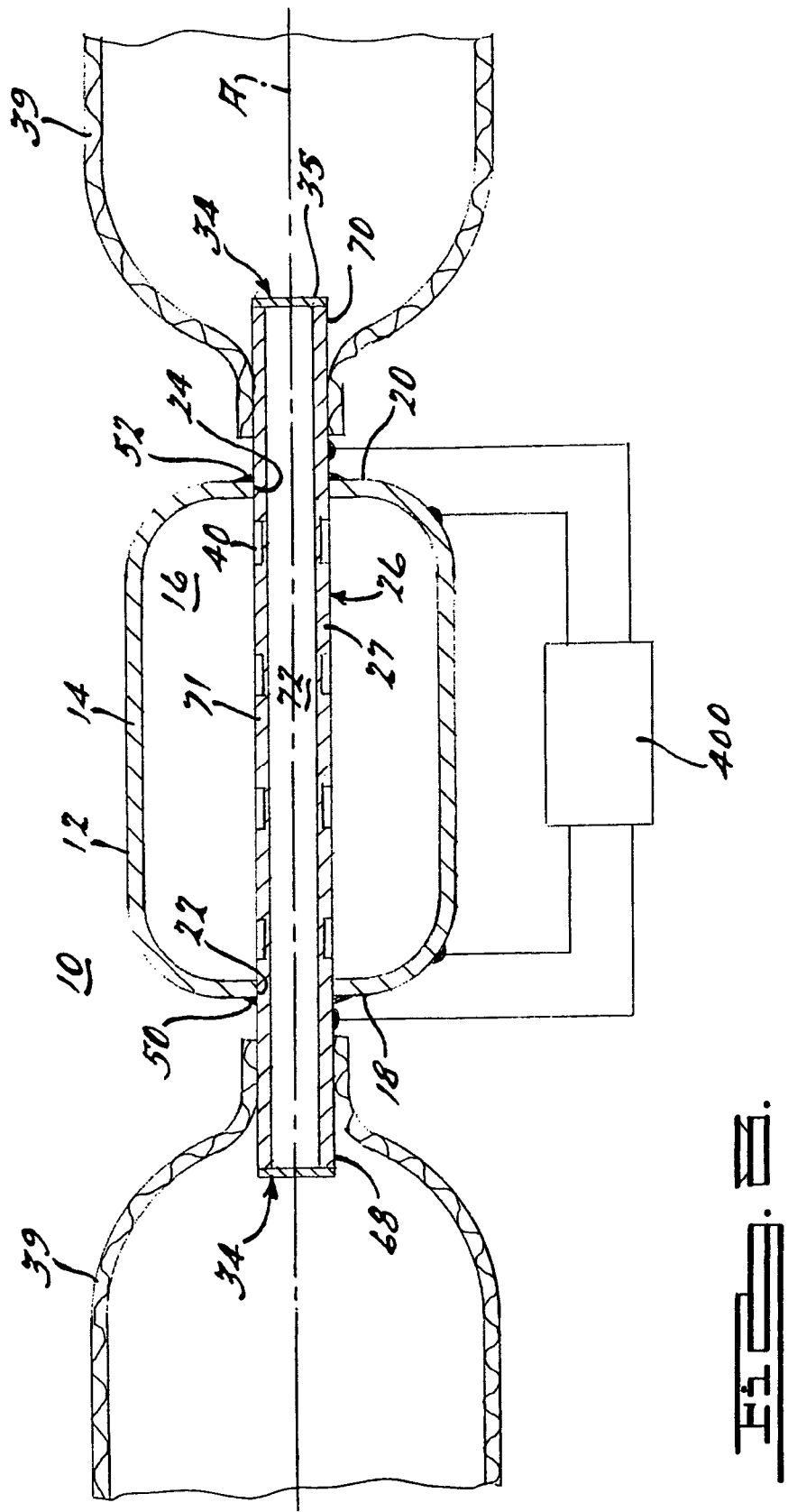

DUAL-FLOW INFLATOR

CROSS REFERENCE TO RELATED APPLICATIONS

This application claims the benefit of provisional application Ser. No. 60/614,741, filed on Sep. 30, 2004.

BACKGROUND OF THE INVENTION

Various problems are associated with inflating large inflatable curtain airbags. Several of these problems arise from an automotive industry requirement that a single inflator be used to inflate these large curtain airbags. Since the entire length of the inflatable curtain must deploy rapidly, it becomes more difficult to deploy the curtain airbag in a short time with a single inflator as the size of the vehicle (and, therefore, the volume of the curtain) increases. To accomplish the required rapid fill using a single inflator in larger curtain airbags, the inflation fluid flow rate from the inflator must increase. However, to accommodate the increased fluid flow rates from the inflator, the material of the airbag must be reinforced to prevent structural damage to the airbag.

SUMMARY OF THE INVENTION

The present invention provides a stored gas inflator comprising a pressure vessel for storing a pressurized medium therein, the pressure vessel having a wall defining an interior of the vessel. It will be appreciated that as used herein, the term "stored gas inflator" is meant to include an inflator including stored gas, and other gas generating compounds or compositions. A gas flow conduit extends through the interior of the pressure vessel. The conduit has a first portion extending from the interior of the vessel through a first portion of the wall to an exterior of the vessel, and a second portion extending from the interior of the vessel through a second portion of the wall to the exterior of the vessel. At least one rupturable barrier is formed along a portion of the conduit that extends through the interior of the vessel, for separating an interior of the conduit from the interior of the pressure vessel prior to activation of the inflator. The rupturable barrier is rupturable upon activation of the inflator to enable fluid communication between an interior of the conduit and the interior of the pressure vessel.

BRIEF DESCRIPTION OF THE DRAWINGS

In the drawings illustrating embodiments of the present invention:

FIG. 1 is a cross-sectional side view of a dual-flow inflator in accordance with the present invention;

FIG. 4 is a cross-sectional side view of a second embodiment of an inflator in accordance with the present invention;

FIG. 5 is a cross-sectional side view of an embodiment of a gas flow conduit in accordance with the present invention;

FIG. 6 is a cross-sectional end view of the gas flow conduit of FIG. 5;

FIG. 7 is a cross-sectional side view of a third embodiment of an inflator in accordance with the present invention;

FIG. 8 is a cross-sectional side view of a fourth embodiment of an inflator in accordance with the present invention; and FIG. 9 is a schematic representation of an exemplary vehicle occupant restraint system incorporating an inflator in accordance with the present invention.

DETAILED DESCRIPTION

Figure 2:
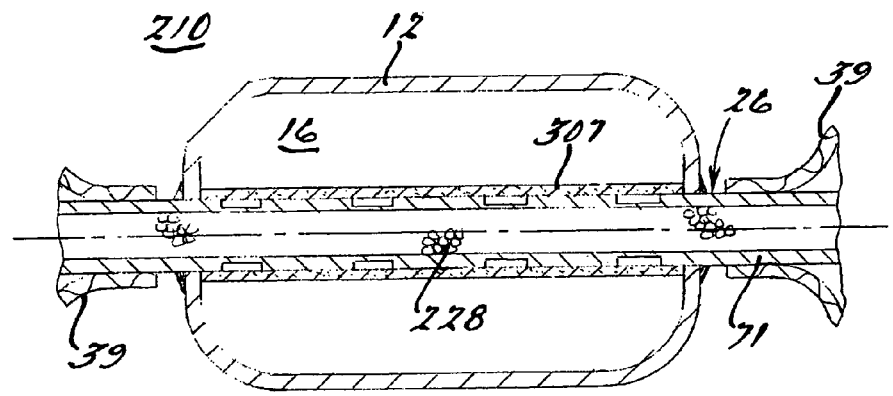
FIG. 2 is a cross-sectional view of the dual-flow inflator of FIG. 1 showing operation of the inflator.

FIGS. 1 and 2 show a cross-section of one embodiment of a dual-flow stored gas inflator 10 in accordance with the present invention. As used herein, the term "dual-flow inflator" is understood to mean an inflator that discharges inflation gas in two, possibly opposing, directions. Inflator 10 includes a pressure vessel 12 having a wall 14 defining an interior cavity 16 of the pressure vessel. In the embodiment shown in FIG. 1, pressure vessel 12 is an elongate pressure vessel having a substantially cylindrical metallic body with a first end 18 and a second end 20. It should be appreciated, however, that alternative pressure vessel body types and designs may be used without departing from the scope of the present invention. Vessel 12 has a longitudinal central axis A and a pair of orifices 22, 24 formed in wall 14. First orifice 22 is formed in a first portion of vessel wall 14, and second orifice 24 is formed in a second portion of the vessel wall spaced apart from the first portion of the vessel wall in which first orifice 22 is formed. The pressure vessel may be extruded, cast, or otherwise metal formed and may be made from carbon steel or stainless steel, for example.

Referring again to FIGS. 1 and 2, an inflation gas flow conduit 26 is positioned in interior cavity 16 of pressure vessel 12 for containment of a pyrotechnic material 28, and for facilitating relatively rapid propagation of pyrotechnic material combustion along the length of the pressure vessel 12. In the embodiment shown in FIGS. 1 and 2, gas flow conduit 26 has an elongate, substantially cylindrical body 27 defining a first end 68, a second end 70, and a wall 71 defining an interior cavity 72 for containing pyrotechnic material 28 therein. In the embodiment shown in FIGS. 1 and 2, gas flow conduit body 27 has a substantially uniform diameter or cross-section. However, other embodiments are contemplated in which the cross-sectional area of gas flow conduit body 27 may vary along the length of the gas flow conduit. Gas flow conduit 26 may for example, be roll formed from sheet metal and then perforated.

Referring again to FIGS. 1 and 2, a portion of gas flow conduit 26 extends through vessel interior cavity 16 and along central axis A of the pressure vessel. Conduit first end 68 is positioned to enable fluid communication between an initiator mechanism (described in greater detail below) and interior cavity 72 of gas flow conduit 26. Gas flow conduit first end 68 extends through pressure vessel first orifice 22. Similarly, gas flow conduit second end 70 extends through pressure vessel second orifice 24. A first hermetic seal 50 is formed at first pressure vessel orifice 22 between gas flow conduit first end 68 and pressure vessel wall 14. Also, a second hermetic seal 52 is formed at second pressure vessel orifice 24 between gas flow conduit second end 70 and pressure vessel wall 14. Hermetic seals 50, 52 prevent an inflation medium stored in pressure vessel 12 from escaping through orifices 22 and 24 and may be formed using any one of a variety of methods, for example, by welding or by incorporating a support structure needed to provide a gasket-type seal. In the embodiment shown in FIGS. 1 and 2, conduit 26 is substantially straight and extends through the interior of pressure vessel 12 to protrude from opposite ends of the pressure vessel. However, other embodiments are contemplated in which the conduit includes curved portions as well as straight portions, to enable the conduit to project from substantially any desired spaced-apart portions of pressure vessel wall 14. In addition, inflation gases are not necessarily discharged from an end portion of the conduit into an associated airbag, but may be discharged from any portion of the conduit projecting to the exterior of the pressure vessel.

Figure 3:
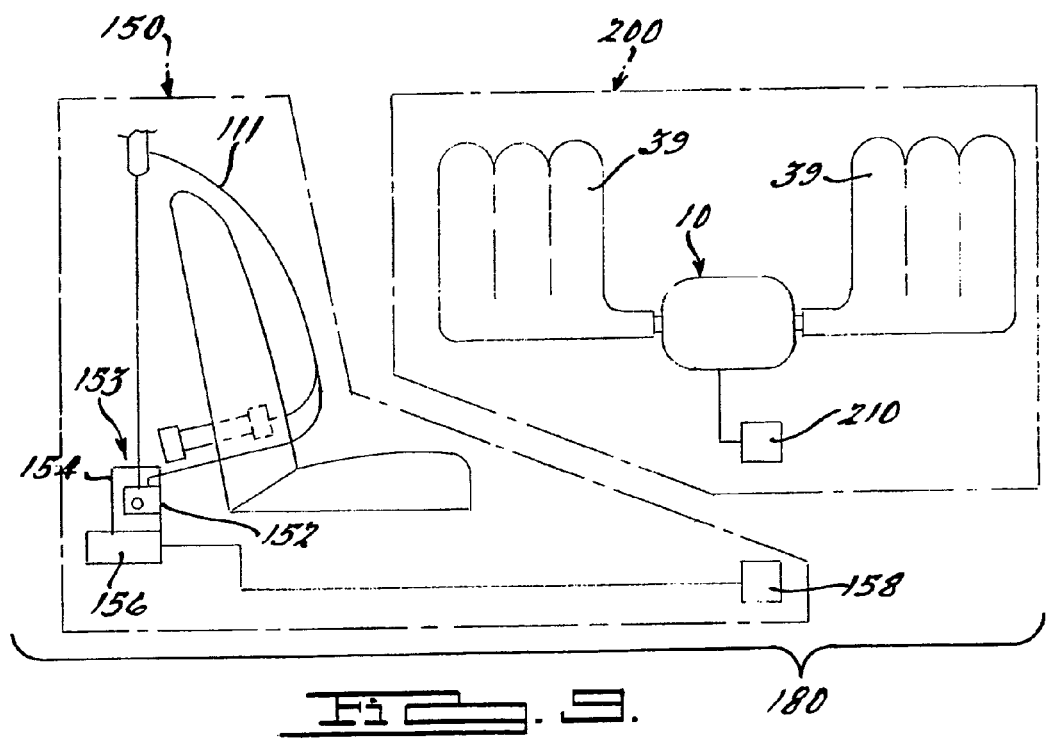
FIG. 3 is a side view of a portion of a pyrotechnic gas flow conduit incorporated into the inflator of FIG. 1 showing various types of rupturable barriers usable in the present invention.

Referring again to FIGS. 1 and 2, gas flow conduit 26 also has one or more rupturable barriers 40 formed along a portion of the gas flow conduit extending through vessel interior cavity 16. Rupturable barriers 40 are pressure rupturable (i.e. configured to rupture when the fluid pressure differential across the rupturable barriers between gas flow conduit interior cavity 72 and an inflation medium stored in pressure vessel 12 exceeds some predetermined level.) Rupturable barriers 40 may be formed using any one of several known methods. For example, the rupturable barriers may be formed by locally reducing the thickness of gas flow conduit wall 71 relative to remaining portions of the wall, to weaken the wall in the location of the rupturable barrier and facilitate rupture at the predetermined pressure differential. Alternatively, as seen in FIG. 3, one or more localized structural defects may be created in gas flow conduit wall 71 to provide one or more corresponding predetermined failure locations. For example, one or more scores or cuts 42, such as axially-extending scores or cruciform scores, can be made along wall 71. The scores may extend either partially or entirely through the material thickness of wall 71.

Referring again to FIG. 3, in another embodiment of the rupturable barriers, an orifice 44 is formed extending through the entire material thickness of wall 71 and a pressure-rupturable member 46, such as a burst disk, is secured over orifice 44 to block the orifice. Disk 46 forms a fluid-tight barrier between the pressurized inflation media in vessel 12 and interior cavity 72 of gas flow conduit 26. Various disks, foils, films, etc. may be used to form burst disk 46, depending on the pressure of the gas sealed in vessel 12 and the desired performance characteristics of inflator 10. For example, disks made from materials and/or having structures which are relatively more or less readily ruptured may be used. Several rupturable barriers of the same type (or differing types) may be formed along the length of gas flow conduit 26 to affect the discharge rate and flow distribution of gases from gas flow conduit 26. However, each embodiment of the rupturable barrier described above is preferably designed to rupture when exposed to a relatively predictable predetermined pressure differential.

Gas flow conduit 26 is also provided with features to enable fluid communication between gas flow conduit interior cavity 72 and an exterior of pressure vessel 12. In the embodiment shown in FIGS. 1 and 2, gas flow conduit 26 includes one or more rupturable barriers 41 (as previously described) and an aperture 34 formed at respective ends 68, 70 of the gas flow conduit. Aperture 34 and rupturable barriers 41 are formed along gas flow conduit 26 in positions such that, when gas flow conduit ends 68 and 70 extend out of pressure vessel 12 through pressure vessel orifices 22 and 24, apertures 34 and barriers 41 enable fluid communication between gas flow conduit interior cavity 72 and an exterior of the pressure vessel. To seal gas flow conduit 26 prior activation of the inflator, a rupturable member such as a burst disk 35 may be secured over aperture 34. Alternatively, one or more rupturable barriers 41 as previously described may be formed proximate either end of gas flow conduit 26, to enable fluid communication between conduit interior 72 and the exterior of the pressure vessel upon inflator activation. In the embodiment shown in FIGS. 1 and 2, end 68 of conduit 26 is blocked by the presence of an igniter 300 (described below) for igniting a pyrotechnic material positioned in conduit interior cavity 72. Thus, one or more rupturable barriers 41 are formed in conduit first end 68 proximate igniter 300 to permit outflow of inflation gas from end 68 of the conduit.

Referring to FIG. 4, in an alternative embodiment of the gas flow conduit, one or more end portions of a central tube 12*a* are sheathed concentrically within one or more end tubes 12*b*. End tubes 12*b* may be attached to central tube 12*a* using any one of several known methods, such as an interference fit or welding. One or more of end tubes 12*b* are coupled to an associated airbag 39 so as to enable fluid communication with the airbag. Rupturable barriers 40 are formed in central tube 12*a* as previously described for admitting a stored inflation medium from pressure vessel 12 upon failure of the rupturable barriers. Rupturable barriers 41 and/or rupturable members 35 are also formed in each end tube 12*b* for dispersing inflation media from the end tube into an attached airbag. Upon failure of the rupturable barriers, inflation media enters central tube 12*a* and flows toward one or more ends of the central tube to enter one or more end tubes 12*b*. The inflation media then flows from end tubes 12*b* to inflate airbag (or airbags) 39. The use of separate connecting tubes 12*b* to connect the inflator to airbags or other associated inflatable elements enables a centralized standard inflator configuration to be attached to inflatable elements (or portions of a single inflatable element) positioned at a wide variety of locations with respect to the body of the inflator; it is necessary to merely form a connecting tube 12*b* having a suitable geometry for connecting the inflator to an inflatable element secured in the desired position in the vehicle, and to provide a suitably-positioned igniter or other combustion initiation mechanism for igniting pyrotechnic material 28 upon activation of the inflator. Connecting tubes 12*b* may also incorporate features for facilitating attachment of the connecting tubes to the main body of the inflator and formation of a hermetic seal therewith.

Referring again to FIGS. 1 and 2, a quantity of a pyrotechnic material 28 is positioned in the interior cavity of pyrotechnic gas flow conduit 26. In the embodiment shown in FIGS. 1 and 2, the extension of pyrotechnic material 28 in a strand along the length of gas flow conduit 26 facilitates a relatively rapid combustion propagation of material 28 across the length of the gas flow conduit. Compositions suitable for use in the gas flow conduit of the embodiment shown in FIGS. 1 and 2 include rapidly burning pyrotechnic materials (for example, $BKNO_3$), a gas generating pyrotechnic, or a combination of rapidly burning and gas generating pyrotechnics. Suitable gas generating pyrotechnics are disclosed, for example, in Applicant's co-pending U.S. patent application Ser. No. 09/664,130, incorporated herein by reference. Other suitable substances include, but are not limited to, those gas generants described in U.S. Pat. Nos. 5,035,757, 6,210,505, and 5,872,329, also incorporated herein by reference in their entirety. In general, any known gas generating pyrotechnic, in any form that is recognized for its utility within a vehicle occupant protection system, for example, may be employed within the pressure vessel 12.

Referring again to FIGS. 1 and 2, the present invention also provides an initiation mechanism for initiating rupture of the rupturable barriers in gas flow conduit 26, thereby permitting an inflation medium stored in vessel 12 to enter gas flow conduit 26 and flow into one or more attached airbags 39. In one embodiment, the initiation mechanism comprises an igniter 300 for igniting pyrotechnic material 28 stored in gas flow conduit 26. Igniter 300 is secured to the inflator so as to enable ignitable or operable communication with pyrotechnic material 28 positioned in interior cavity 72 of gas flow conduit 26, upon activation of the inflator. In the embodiment shown in FIGS. 1 and 2, igniter 300 is positioned in end 68 of conduit 26 so as to hermetically seal end 68. Thus, in the embodiment shown in FIGS. 1 and 2, conduit 26 serves as a combustion chamber for the combustion of pyrotechnic material 28 upon activation of the inflator. Igniter 300 may be formed as known in the art. An exemplary igniter construction is described in U.S. Pat. No. 6,009,809, herein incorporated by reference.

FIGS. 5 and 6 show an alternative embodiment of the inflator, which differs from the embodiment shown in FIGS. 1 and 2 in the design of the portion of conduit 26 residing within pressure vessel 12. In the embodiment shown in FIGS. 5 and 6, pyrotechnic material 128 is formed as a rapidly burning pyrotechnic cord having a first end 128a positioned at or proximate first end 68 of gas flow conduit 26 and a second end 128b positioned at or proximate second end 70 of gas flow conduit 26. One end of cord 128 is positioned relative to igniter 300 so as to enable fluid communication between cord 128 and igniter 300 upon activation of the inflator. Many types of these cords are commercially available, and may be known under the designations RDC (rapid deflagrating cord), TLX® (transmission line explosive), or ITLX® (ignition transmission line explosive), manufactured, for example, by OAE Aerospace of Fairfield, Calif. Typically, these cords have an inner pyrotechnic charge (or multiple strands of pyrotechnic charges) 305 enclosed in a synthetic or metal sheath 304. In the embodiment shown in FIGS. 5 and 6, the pyrotechnic cord provides an element of structural support for gas flow conduit wall 71. This enables the thickness of gas flow conduit wall 71 to be reduced while still resisting pressure exerted by a stored inflation medium in pressure vessel 12. The use of a rapidly burning, linear ignition cord, as described above, quickly removes structural support for gas flow conduit wall 71 over the entire length of the gas flow conduit, thereby enabling rupture of rupturable barriers 40.

Referring to FIG. 7, in yet another embodiment, gas flow conduit 26 may contain a fuel-rich pyrotechnic compound 228, for example, positioned along the interior of the conduit. In this embodiment, combustion of pyrotechnic compound 228 results in by-products which combine with, and depending on design characteristics, chemically react with, the stored inflation medium in pressure vessel 12 upon the rupture of gas flow conduit rupturable barriers 40. This reaction increases the pressure in the inflation medium, which flows into gas flow conduit 26 through ruptured barriers 40 and thence into one or more airbags coupled to inflator 10. An outer surface of gas flow conduit 26 in communication with interior cavity 16 of pressure vessel 12 may be provided with a catalyst coating 307 for promoting ignition of the fuel-inflation medium mixture. Alternatively, the catalyst may be provided in the pyrotechnic compound itself. If desired, either the pyrotechnic compound or an outer surface of gas flow conduit 26 in communication with interior cavity 16 of vessel 12 may also (or alternatively) be provided with a catalyst coating for promoting nitrous dissociation in any nitrous oxide-bearing inflation medium stored in pressure vessel 12.

In another alternative embodiment, shown in FIG. 8, the initiator mechanism comprises a current source 400 (shown schematically) electrically coupled to at least one of pressure vessel 12 and gas flow conduit 26 for providing a current to heat the pressure vessel and/or the body 27 of the gas flow conduit through resistance heating. In this embodiment, heating of pressure vessel 12 and/or gas flow conduit body 27 produces a temperature rise in an inflation medium stored in pressure vessel 12, resulting in a rise in pressure in the vessel. In this embodiment, the inflation medium may comprise, for example, a liquid with a high coefficient of thermal expansion which evaporates upon a reduction in vessel interior pressure produced by the rupture of the rupturable barriers previously described. Upon heating, when pressure in the inflation medium reaches a predetermined level, failure of rupturable barriers 40 occurs, releasing the inflation medium into gas flow conduit 26.

As stated previously, a quantity of inflation medium for inflating the airbags is stored in the interior of pressure vessel 12. The medium may be a substantially unreactive pressurized gas. As used herein, the term "substantially unreactive" is understood to mean that the pressurized gas stored in pressure vessel 12 is unable to sustain a combustion reaction given an incomplete combustion system. For example, the pressurized gas may be substantially oxygen-free, and may comprise a single substantially unreactive element (such as nitrogen) or a compound formed from two or more such elements, such as nitrogen and helium, or argon and helium. Various other unreactive gases and gas mixtures might be used without departing from the scope of the present invention.

Alternatively, the inflation medium may be formed from a mixture of reactive gases, such as a combustible fuel gas combined with an oxidant. For example, a mixture of nitrous oxide, argon, and methane, or a mixture of liquefied nitrous oxide and carbon dioxide may be used. In another alternative embodiment, a mixture of liquefied gases, such as nitrous oxide and $CO_2$ may also be used. Yet another suitable alternative is a multi-phase mixture of gases, liquids and solids. As stated previously, the inflation medium may alternatively comprise, for example, a liquid with a high coefficient of thermal expansion which evaporates into gaseous form upon a reduction in vessel interior pressure produced by the rupture of the rupturable barriers previously described.

Pressure vessel 12 may be pressurized and sealed using any one of several methods known in the art. One exemplary method of pressurizing and sealing vessel 12 is described in U.S. Pat. No. 6,488,310, herein incorporated by reference in its entirety. Using this method, pressure vessel 12 is charged from a small hole formed in a boss (not shown) formed in one end of the pressure vessel. The hole is then closed using a seal pin or other suitable means.

Operation of the inflator will now be discussed. Referring to FIGS. 1 and 2, upon a crash event, a signal from a crash sensor (not shown) is conveyed to igniter 300, thereby activating the igniter and igniting pyrotechnic material 28 positioned inside gas flow conduit 26. Ignition of pyrotechnic material 28 results in a relatively rapid generation of combustion gases in the interior of gas flow conduit 26. As combustion of pyrotechnic 28 progresses from gas flow conduit first end 68 toward second end 70, pressure within gas flow conduit 26 rapidly increases, producing failure of rupturable barriers 40. This results in the transfer of heat and combustion by-products generated by combustion of the pyrotechnic (via failed rupturable barriers 40) to the stored inflation medium in pressure vessel 12. In embodiments where the stored inflation medium is a reactive gas mixture, a chemical reaction in the stored gas mixture is also initiated. The pressurized medium stored in vessel 12 is then released through failed rupturable barriers 40, thereafter exiting the inflator via apertures 34 and ruptured barriers 41 formed in the ends of the gas flow conduit. Pressurized medium leaving apertures 34 and ruptured barriers 41 proceeds into corresponding inflatable elements of a vehicle occupant restraint system, for example, side curtain airbags 39, thereby inflating the airbags.

Upon activation of the inflator, it is desirable to induce rupture of the conduit wall at a sufficient number of points along the conduit such that the flow rate of gas out of the conduit into an associated airbag is controlled by the total cross-sectional area of the gas exit apertures leading from the conduit into the airbag, rather than by the cross-sectional areas of the ruptured portions of the conduit. That is, the flow rate of inflation gases into the airbag or other inflatable element should be determined only by the cross-sectional area of the flow passage between the conduit and the inflatable element. Thus, the number and shapes of the flow passages between the conduit interior 72 and the interiors of airbags 39 are designed to enable the desired gas flow rate into the airbags.

Operation of an embodiment using the gas flow conduit shown in FIGS. 5 and 6 is essentially the same as described above. Upon ignition of igniter 300, the consumption of pyrotechnic cord 128 removes structural support for gas flow conduit wall 71, resulting in failure of rupturable barriers 40. The pressurized media stored in vessel 12 is then released through failed rupturable barriers 40, thereafter exiting the inflator via apertures 34 and rupturable barriers 41 formed in ends 68, 70 of gas flow conduit 26. Pressurized medium leaving the apertures proceeds into one or more inflatable elements of a vehicle occupant restraint system, for example, one or more side curtain airbags 39, thereby inflating the airbags.

Referring to FIGS. 1, 2, and 9, inflator 10 may be incorporated into an airbag assembly 200 including inflator 10 and one or more airbags 39 attached to the inflator so as to enable fluid communication with pyrotechnic gas flow conduit 26. FIG. 9 shows one embodiment of an airbag system in accordance with the present invention. In this embodiment, an airbag 39 is connected to each of ends 68, 70 of gas flow conduit 26 (FIGS. 1 and 2). Hermetic seals are formed between gas flow conduit 26 and airbags 39 using a method known in the art. As previously described, upon failure of rupturable barriers 40 in gas flow conduit 26, stored inflation medium flows into gas flow conduit 26 and out through end portions of the gas flow conduit into airbags 39. Airbag assembly 200 may also be in communication with a crash event sensor 210 including a known crash sensor algorithm that signals actuation of airbag assembly 200 via, for example, activation of airbag inflator 204 in the event of a collision. Airbag assembly 200 may also be incorporated into an airbag system (not shown) including additional inflators and airbags attached thereto. For example, each airbag may receive a supply of inflation gas from one, two, or even more inflators attached to the airbag. This enables each inflator to fill a fraction of the total airbag curtain volume using a lower flow rate from each gas exit orifice of the inflator, enabling a greater total flow of gas into the airbag to more rapidly inflate the airbag without the need to achieve a greater gas flow rate through a single gas exit orifice.

In another embodiment (not shown), both end portions of the gas flow conduit are connected to the interior of a single airbag, to provide a greater total gas flow rate into the airbag, thereby obviating the need to achieve a greater gas flow rate through a single gas exit orifice.

Referring again to FIG. 9, airbag assembly 200 may also be incorporated into a broader, more comprehensive vehicle occupant restraint system 180 including additional elements such as a safety belt assembly 150. Safety belt assembly 150 may include a safety belt housing 152 and a safety belt 111 extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference. Safety belt system 150 may also be in communication with a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

The invention claimed is:

1. A stored gas inflator comprising:
   a pressure vessel for storing a pressurized medium therein, the pressure vessel including a wall defining an interior of the vessel;
   a gas flow conduit extending through the interior of the vessel, the conduit including a first portion extending from the interior of the vessel through a first portion of the wall to an exterior of the vessel, and a second portion extending from the interior of the vessel through a second portion of the wall to the exterior of the vessel; and
   at least one rupturable barrier formed along a portion of the conduit that extends through the interior of the vessel, for separating an interior of the conduit from the interior of the pressure vessel prior to activation of the inflator, the rupturable barrier being rupturable upon activation of the inflator to enable fluid communication between an interior of the conduit and the interior of the pressure vessel.

2. The inflator of claim 1 further comprising at least one rupturable barrier formed along the conduit exterior of the pressure vessel, for enabling fluid communication between the interior of the conduit and an exterior of the pressure vessel upon activation of the inflator.

3. The inflator of claim 1 wherein the vessel has an interior pressure, and wherein the inflator further comprises a pressurized medium stored in the pressure vessel, the pressurized medium having a coefficient of thermal expansion such that evaporation of the medium occurs upon a reduction of the vessel interior pressure.

4. The inflator of claim 3 further comprising an electrical current source operatively coupled to at least one of the pressure vessel and the conduit for supplying a current to the at least one of the pressure vessel and the conduit, to heat the at least one of the pressure vessel and the conduit through resistance heating.

5. The inflator of claim 1 wherein the conduit has a quantity of a pyrotechnic material positioned in an interior thereof, and wherein the conduit defines a combustion chamber for the pyrotechnic material.

6. The inflator of claim 5 further comprising a pressurized medium stored in the interior of the pressure vessel, and wherein combustion of the pyrotechnic material generates combustion products adapted for chemically reacting with the pressurized medium.

7. The inflator of claim 5 further comprising at least one gas stored under pressure in the interior of the pressure vessel, wherein the at least one gas is reactive with combustion products formed by combustion of the pyrotechnic material to form an ignitable compound.

8. The inflator of claim 5 wherein the pyrotechnic material comprises a rapidly burning pyrotechnic cord extending along the interior of the conduit.

9. The inflator of claim 8 wherein the pyrotechnic cord abuts a wall of the conduit so as to provide structural support for the wall.

10. The inflator of claim 5 further comprising an igniter positioned to enable fluid communication with the pyrotechnic material upon activation of the inflator, for initiating combustion of the pyrotechnic material upon activation of the inflator.

11. The inflator of claim 1 wherein the conduit includes a wall defining the interior of the conduit, the wall having a predetermined wall thickness, and wherein the at least one rupturable barrier comprises a portion of the wall having a thickness less than the predetermined wall thickness.

12. The inflator of claim 1 wherein the at least one rupturable barrier comprises at least one localized defect formed in a structure of the conduit wall, the defect being adapted to facilitate a localized failure of the structure of the conduit upon activation of the inflator.

13. The inflator of claim 12 wherein the at least one localized defect is adapted to facilitate localized failure of the structure of the conduit upon exposure to a predetermined pressure differential between the interior of the conduit and the interior of the pressure vessel.

14. The inflator of claim 13 wherein the at least one localized defect comprises a cut formed along a portion of a surface of the conduit wall.

15. The inflator of claim 14 wherein the cut extends entirely through a thickness of a wall of the conduit.

16. The inflator of claim 1 wherein the at least one rupturable barrier comprises an orifice extending entirely through a thickness of a wall of the conduit, and a pressure-rupturable member secured over the orifice to seal the orifice.

17. The inflator of claim 1 wherein the conduit comprises an elongated tube extending between opposite ends of the pressure vessel.

18. The inflator of claim 1 wherein the gas flow conduit further comprises at least a third portion coupled to one of the first portion of the conduit and the second portion of the conduit exterior of the pressure vessel, for use in coupling the inflator to an inflatable element of a vehicle occupant protection system.

19. A stored gas inflator comprising:
a pressure vessel for storing a pressurized medium in an interior thereof,
a combustion chamber extending through the interior of the pressure vessel, the combustion chamber being adapted to enable fluid communication between the combustion chamber and an exterior of the inflator upon activation of the inflator;
at least one rupturable barrier formed along a portion of the combustion chamber extending through the interior of the vessel, for separating an interior of the combustion chamber from the interior of the pressure vessel prior to activation of the inflator;
a pressurized medium stored in the interior of the pressure vessel so as to enable fluid communication between the pressurized medium and the combustion chamber upon rupture of the at least one rupturable barrier; and
a quantity of a pyrotechnic material positioned in the combustion chamber such that, upon activation of the inflator, combustion of the pyrotechnic material produces rupturing of the at least one rupturable barrier, thereby permitting the pressurized medium to flow through the ruptured barrier into the combustion chamber and out of the combustion chamber to the exterior of the inflator.

20. A vehicle occupant protection system comprising:
an airbag system including a stored gas inflator including:
a pressure vessel for storing a pressurized medium therein, the pressure vessel having a wall defining an interior of the vessel;
a gas flow conduit extending through the interior of the pressure vessel, the conduit having a first portion extending from the interior of the vessel through a first portion of the wall to an exterior of the vessel, and a second portion extending from the interior of the vessel through a second portion of the wall to the exterior of the vessel, and
at least one rupturable barrier formed along a portion of the conduit that extends through the interior of the vessel, for separating an interior of the conduit and the interior of the pressure vessel prior to activation of the inflator, the rupturable barrier being rupturable upon activation of the inflator to enable fluid communication between an interior of the conduit and the interior of the pressure vessel; and
an airbag coupled to at least one of the first portion and the second portion of the conduit so as to enable fluid communication between an interior of the airbag and the at least one of the first portion and the second portion of the conduit upon activation of the inflator.

* * * * *